(12) United States Patent
Park et al.

(10) Patent No.: US 11,048,025 B2
(45) Date of Patent: Jun. 29, 2021

(54) ANTI-REFLECTION COATING AND METHOD OF FORMING THE SAME

(71) Applicant: Korea University Research and Business Foundation, Seoul (KR)

(72) Inventors: Q Han Park, Seoul (KR); Ku Im, Seoul (KR); Ji Hun Kang, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 171 days.

(21) Appl. No.: 16/296,836

(22) Filed: Mar. 8, 2019

(65) Prior Publication Data

US 2020/0081161 A1 Mar. 12, 2020

(30) Foreign Application Priority Data

Sep. 7, 2018 (KR) .................. 10-2018-0107281

(51) Int. Cl.
*G02B 1/00* (2006.01)
*G02B 1/115* (2015.01)
(Continued)

(52) U.S. Cl.
CPC ............. *G02B 1/115* (2013.01); *B32B 7/02* (2013.01); *G02B 1/111* (2013.01); *G02B 1/118* (2013.01)

(58) Field of Classification Search
CPC ......... G02B 1/115; G02B 1/118; G02B 1/111; G02B 1/002; B32B 7/02; B82Y 20/00; H01L 31/02168
(Continued)

(56) References Cited

U.S. PATENT DOCUMENTS 5,063,418 A * 11/1991 Shurtz, II ................ H01G 7/00
257/443
6,519,392 B2 * 2/2003 Im ........................ G02B 6/2817
385/48
(Continued)

FOREIGN PATENT DOCUMENTS

JP       6307328 B2    4/2018
KR    10-1347629 B1    1/2014
(Continued)

OTHER PUBLICATIONS

Metasurface Optical Antireflection coating, Zhang et al, Applied Physics Letter 105, 241113(2014) (Year: 2014).*
(Continued)

*Primary Examiner* — Audrey Y Chang
(74) *Attorney, Agent, or Firm* — NSIP Law

(57) ABSTRACT

The present disclosure discloses an anti-reflection coating and a method of forming the same. According to one embodiment of the present disclosure, the anti-reflection coating includes a first layer positioned on a substrate to be spaced apart from the substrate by a first distance and a second layer positioned on the first layer to be spaced apart from the first layer by a second distance. In this case, the first and second layers are a metamaterial forming a structural double layer and are realized as an anomalous dispersive medium that does not absorb incident light. The structural double layer may realize spatiotemporal dispersion that varies depending on an incidence angle using the nonlocality of the electromagnetic wave reaction of incident light.

10 Claims, 17 Drawing Sheets

(51) Int. Cl.
    *G02B 1/118*     (2015.01)
    *G02B 1/111*     (2015.01)
    *B32B 7/02*     (2019.01)

(58) Field of Classification Search
    USPC .............................. 257/443; 385/48; 359/577
    See application file for complete search history.

(56) References Cited

U.S. PATENT DOCUMENTS

| | | |
|---|---|---|
| 6,756,932 B1 | 6/2004 | Barker et al. |
| 2015/0130973 A1* | 5/2015 | Saito ...................... G02B 13/14 |
| | | 348/252 |

FOREIGN PATENT DOCUMENTS

| | | |
|---|---|---|
| KR | 10-1624489 B1 | 5/2016 |
| KR | 10-2017-0035826 A | 3/2017 |
| KR | 10-2017-0137206 A | 12/2017 |

OTHER PUBLICATIONS

Horsley, Simon, "Non-locality prevents reflection", *Nature Photonics*, vol. 12, 2018, (pp. 127-128).

* cited by examiner

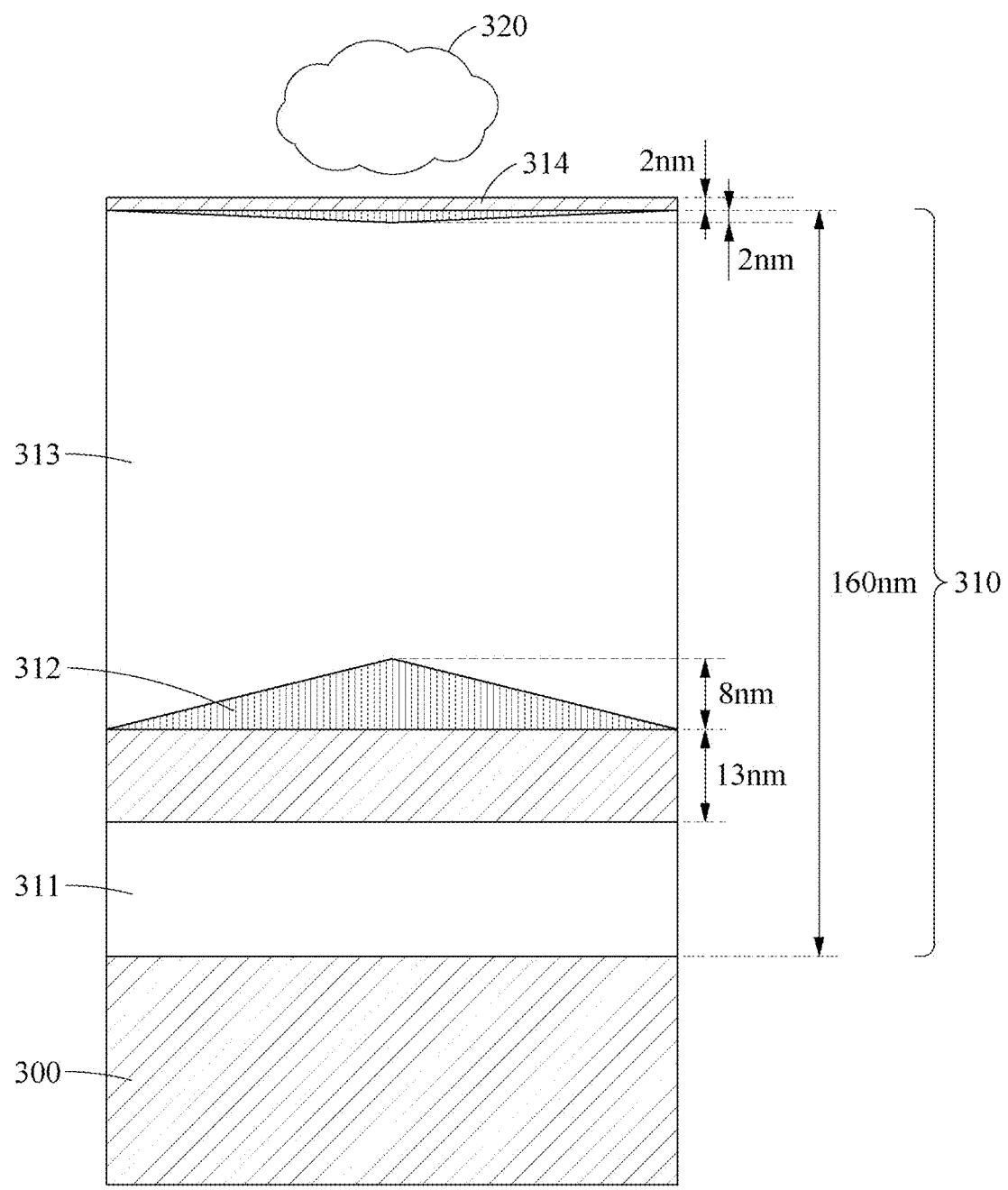

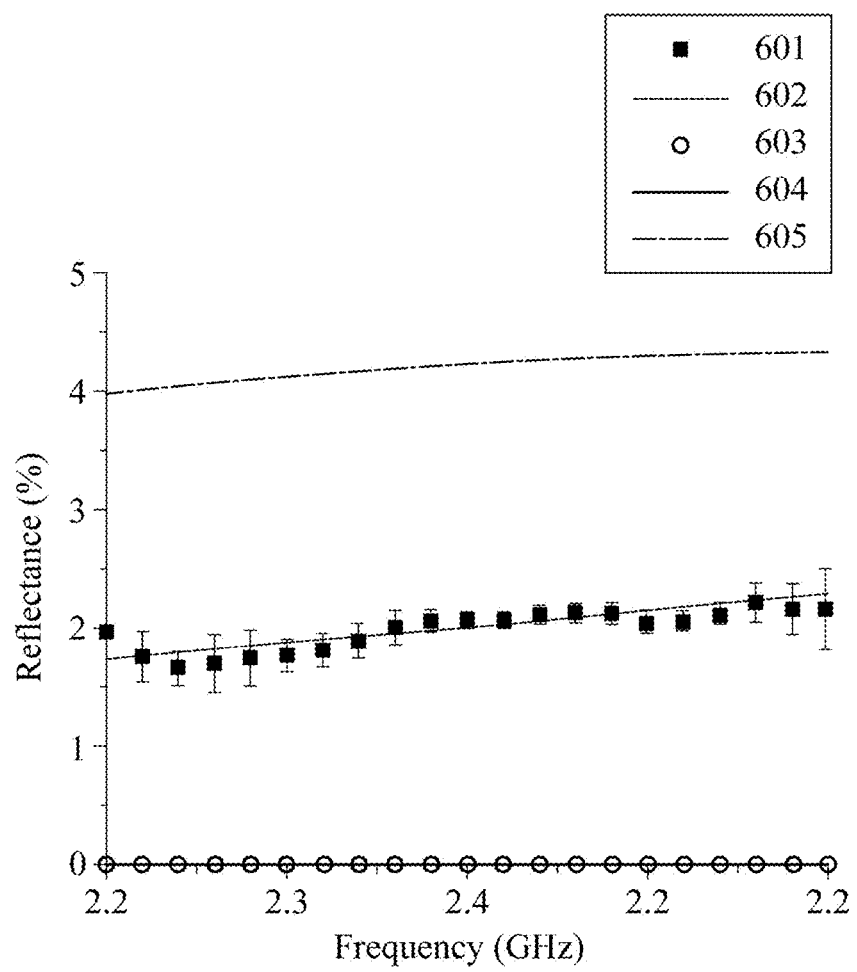

ANTI-REFLECTION COATING AND METHOD OF FORMING THE SAME

CROSS-REFERENCE TO RELATED APPLICATION

This application claims priority to Korean Patent Application No. 10-2018-0107281, filed on Sep. 7, 2018 in the Korean Intellectual Property Office, the disclosure of which is incorporated herein by reference.

BACKGROUND OF THE DISCLOSURE

Field of the Disclosure

The present disclosure relates to a technical idea related to an anti-reflection coating for preventing reflection between two materials having different optical and electromagnetic properties. More particularly, the present disclosure relates to an anti-reflection coating that realizes spatiotemporal dispersion that varies depending on an incidence angle using the nonlocality of an electromagnetic wave reaction and that provides the universal impedance matching between two different materials independent of change in incidence angle and frequency, and a method of forming the anti-reflection coating.

Description of the Related Art

In general, when light or electromagnetic waves are transmitted through the boundary between two materials having different optical and electromagnetic properties, the light or electromagnetic waves may be partially or completely reflected due to impedance or admittance mismatch.

Light reflection may cause energy loss, which degrades the performance and efficiency of various optical and electromagnetic devices and equipment.

To prevent performance degradation due to reflection, anti-reflection technologies to control reflection are being continuously developed.

As representative anti-reflection technologies, there are technologies using a quarter-wave anti-reflection coating, a multilayer anti-reflection coating, an inhomogeneous anti-reflection coating, and an anti-reflection coating using a metamaterial.

The quarter-wave anti-reflection coating has the simplest structure and may perform an anti-reflection function.

However, use of the quarter-wave anti-reflection coating may be limited since the quarter-wave anti-reflection coating exhibits anti-reflection performance only for monochromatic light or electromagnetic waves when light reaches the interface vertically.

Therefore, to solve the disadvantage of operating only for monochromatic light, the multilayer anti-reflection coating, the inhomogeneous anti-reflection coating, and a dispersive impedance matching anti-reflection coating have been proposed.

In addition to the multilayer anti-reflection coating, there is a moth-eye anti-reflection coating that is a kind of technologically advanced inhomogeneous anti-reflection coatings. Through development of the moth-eye anti-reflection coating, research has been conducted to overcome limitations of anti-reflective wavelength spectrum.

However, in the case of the multilayer anti-reflection coating, there is a disadvantage in that the thickness of an anti-reflection coating is thick with respect to wavelengths.

To solve this problem, the prior study (Korean Patent Application Publication No. 10-2012-0105320) was conducted to design an anti-reflection coating having a thin thickness with respect to wavelengths using a metamaterial such as a dispersive impedance matching anti-reflection coating.

The above technologies have been developed to overcome spectrum limitations. However, in the case of all of the technologies, there is a disadvantage that they only work when light is incident perpendicularly to the interface between two media, or the operation of the devices of the technologies is limited only for a certain incidence angle.

In order to block reflection of light regardless of incidence angles, impedance that varies depending on incidence angles is required.

That is, considering impedance, the response of a medium to electromagnetic waves must be spatially non-local, and spatial dispersion using such spatial nonlocality is required.

The impedance of a medium changes with frequency. This is called temporal dispersion.

For materials with spatiotemporal dispersion, the materials may look different depending on both frequency and the angle at which light is incident. This spatiotemporal dispersion may be realized by providing space between the layers of two media, and a structure having dispersion capable of transmitting light more effectively may be designed by providing a structure in the layers.

In general, in metamaterials, by providing the medium with a smaller structure than the wavelength of light, the medium may exhibit new photoreaction properties rather than the original photoreaction properties. The variable describing this photoreaction is referred to as the effective material parameter.

Therefore, a technology for improving transmission of light or electromagnetic waves using an anti-reflection coating as a metamaterial, performing spatiotemporal dispersion regarding of the frequency, incidence angle, and polarization direction of light, is needed.

RELATED DOCUMENTS

Patent Documents

Korean Patent No. 10-1347629, "ANTI-REFLECTION COATING, AND METHOD OF FORMING THE SAME"

Korean Patent No. 10-1624489, "INFRARED DETECTOR USING METAMATERIAL-BASED ANTI-REFLECTION COATING FOR MATCHING IMPEDANCES BETWEEN AIR AND SURFACE PLASMA RESONATOR"

Japanese Patent No. 6307328, "METAMATERIAL OPTICAL MEMBER, LIGHT SENSING DEVICE, LASER EXCITATION LIGHT SOURCE, AND MEASURING DEVICE"

U.S. Pat. No. 6,756,932, "MICROWAVE ABSORBING MATERIAL"

SUMMARY OF THE DISCLOSURE

The present disclosure has been made in view of the above problems, and it is an object of the present disclosure to provide an anti-reflection coating that blocks reflection of light or electromagnetic waves regardless of the frequency, incidence angle, and polarization direction of light.

It is another object of the present disclosure to reduce energy loss due to reflection of light and improve energy transfer efficiency in solar cell panels, optical lenses, and various optical devices.

It is another object of the present disclosure to improve the efficiency of solar power generation by efficiently collecting sunlight regardless of change in the incidence angle of sunlight.

It is another object of the present disclosure to reduce the size of a device, which is required for an anti-reflection coating, by designing an anti-reflection coating that is not dependent on incidence angle, compared to an anti-reflection coating having a thickness larger than wavelength such as a multilayer anti-reflection coating.

It is another object of the present disclosure to provide a thin material that completely blocks reflection of light between two media having different refractive indices, regardless of the incidence angle and frequency of incident light, using two layers for spatiotemporal dispersion.

It is another object of the present disclosure to provide a systematic method for the design of an anti-reflection coating, in which impedance matching may be achieved regardless of incidence angle of light by providing a structure to two medium layers.

It is yet another object of the present disclosure to improve energy efficiency by reducing energy loss due to reflection from the protective glass of a display.

In accordance with the present disclosure, the above and other objects can be accomplished by the provision of anti-reflection coating including a first layer positioned on a substrate to be spaced apart from the substrate by a first distance and a second layer positioned on the first layer to be spaced apart from the first layer by a second distance, wherein the first and second layers are a metamaterial forming a structural double layer and are realized as an anomalous dispersive medium that does not absorb incident light, and the structural double layer realizes spatiotemporal dispersion that varies depending on an incidence angle using the nonlocality of the electromagnetic wave reaction of incident light.

According to one embodiment of the present disclosure, the structural double layer may block reflection of incident light between two materials having different optical or electromagnetic properties regardless of at least one of the frequency, incidence angle, and polarization direction of light.

According to one embodiment of the present disclosure, the structural double layer may implement impedance matching between two different materials.

According to one embodiment of the present disclosure, the substrate may include any one of a high refractive index glass substrate and a high density polyethylene (HDPE) substrate.

According to one embodiment of the present disclosure, when the substrate is any one of the high refractive index glass substrate and the high density polyethylene (HDPE) substrate, each of the first and second layers may include a plurality of unit cells.

According to one embodiment of the present disclosure, the lower part of the unit cells may be flat, and the upper part of the unit cells may form a predetermined inclination angle.

According to one embodiment of the present disclosure, the structural double layer may be realized as a metamaterial having spatiotemporal dispersion through a space having a size smaller than a wavelength size between the first and second layers.

According to one embodiment of the present disclosure, when the substrate is the high refractive index glass substrate, the first and second layers may be formed using tantalum oxide ($Ta_2O_5$), and the first and second distances may be formed of porous magnesium fluoride ($MgF_2$).

According to one embodiment of the present disclosure, when the substrate is the high refractive index glass substrate, the thickness ratio of the first layer to the second layer may be 1:5, and the second distance may be 3.5 times the first distance.

According to one embodiment of the present disclosure, when the substrate is the high density polyethylene (HDPE) substrate, the first and second layers may be formed using the same material as the substrate, and the first and second distances may be formed of Styrofoam.

According to one embodiment of the present disclosure, when the substrate is the high density polyethylene (HDPE) substrate, the second distance may be two times the first distance.

In accordance with an aspect of the present disclosure, the above and other objects can be accomplished by the provision of a method of forming an anti-reflection coating including a step of forming a first layer positioned on a substrate to be spaced apart from the substrate by a first distance and a step of forming a second layer positioned on the first layer to be spaced apart from the first layer by a second distance, wherein the first and second layers are a metamaterial forming a structural double layer and are realized as an anomalous dispersive medium that does not absorb incident light, and the structural double layer realizes spatiotemporal dispersion that varies depending on an incidence angle using the nonlocality of the electromagnetic wave reaction of incident light.

BRIEF DESCRIPTION OF THE DRAWINGS

The above and other objects, features and other advantages of the present disclosure will be more clearly understood from the following detailed description taken in conjunction with the accompanying drawings, in which:

FIGS. 3A and 3B are diagrams showing an example in which an anti-reflection coating according to one embodiment of the present disclosure is formed on a high refractive index glass substrate;

FIGS. 6A to 6D are graphs showing the reflectance of an anti-reflection coating according to one embodiment of the present disclosure formed on a high density polyethylene substrate.

DETAILED DESCRIPTION OF THE DISCLOSURE

Figure 1A:
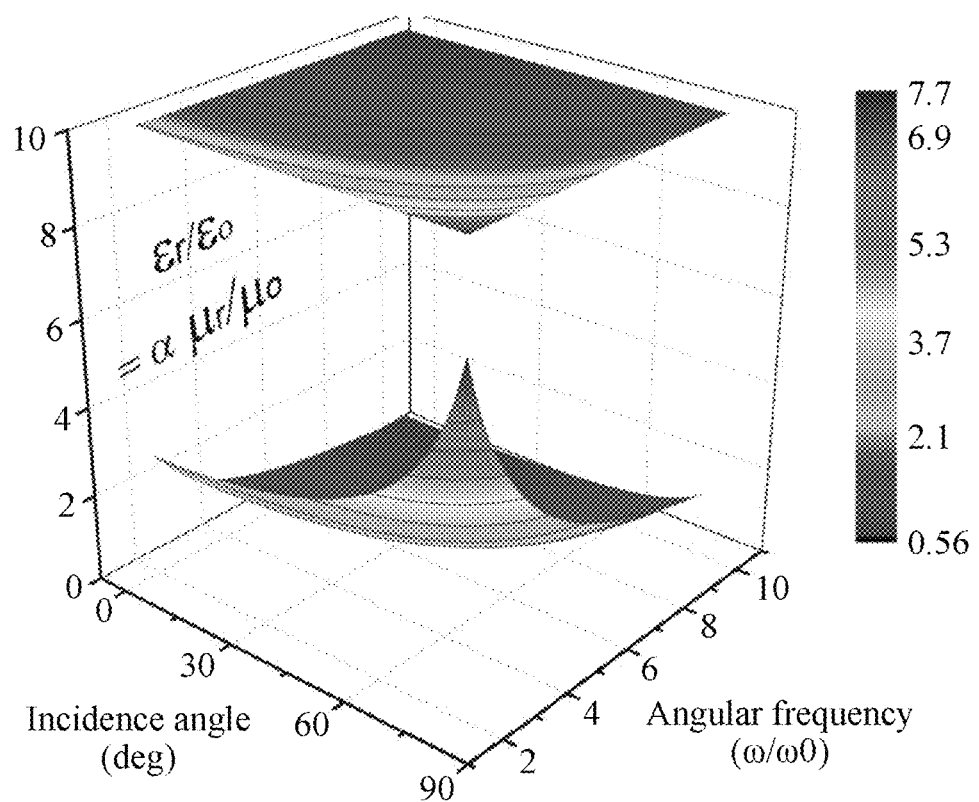
FIGS. 1A and 1B are graphs for explaining the relative permittivity and magnetic permeability of a material implementing spatiotemporal dispersion according to one embodiment of the present disclosure and a substrate.

The embodiments will be described in detail herein with reference to the drawings.

However, it should be understood that the present disclosure is not limited to the embodiments according to the concept of the present disclosure, but includes changes, equivalents, or alternatives falling within the spirit and scope of the present disclosure.

In addition, in the following description of the present disclosure, a detailed description of known functions and configurations incorporated herein will be omitted when it may make the subject matter of the present disclosure unclear.

The terms used in the specification are defined in consideration of functions used in the present disclosure, and can be changed according to the intent or conventionally used methods of clients, operators, and users. Accordingly, definitions of the terms should be understood on the basis of the entire description of the present specification.

Like reference numerals refer to like elements in describing each drawing.

In the present specification, singular expressions encompass plural expressions unless clearly specified otherwise in context.

In this specification, the expressions "A or B" and "at least one of A and B" may include all possible combinations of the items listed together.

Expressions "first" and "second" can be used to qualify the components, regardless of order or importance, and are used to distinguish one component from another, and do not limit the components.

It should be understood that when an element (e.g., first) is referred to as being "connected to" or "coupled to" another element (e.g., second), the element may be directly connected or coupled to the other element or intervening element (e.g., a third element) may be present.

As used herein, "configured to" may be used interchangeably with, for example, "suitable for", "ability to", "changed to", "made to", "capable of", or "designed to" in terms of hardware or software.

In some situations, the expression "device configured to" may mean that the device can perform a specific function with other devices or components.

For example, the expression "processor configured to perform A, B, and C" may mean that a general-purpose processor (e.g., CPU or application processor) performs the corresponding operations by executing a dedicated processor (e.g., an embedded processor) or one or more software programs stored in the memory device.

In addition, the expression "or" means "inclusive or" rather than "exclusive or". That is, unless otherwise mentioned or clearly inferred from context, the expression "x uses a or b" means any one of natural inclusive permutations.

Terms, such as "unit" or "module" should be understood as a unit that processes at least one function or operation and that may be embodied in a hardware manner, a software manner, or a combination of the hardware manner and the software manner.

Figure 1B:
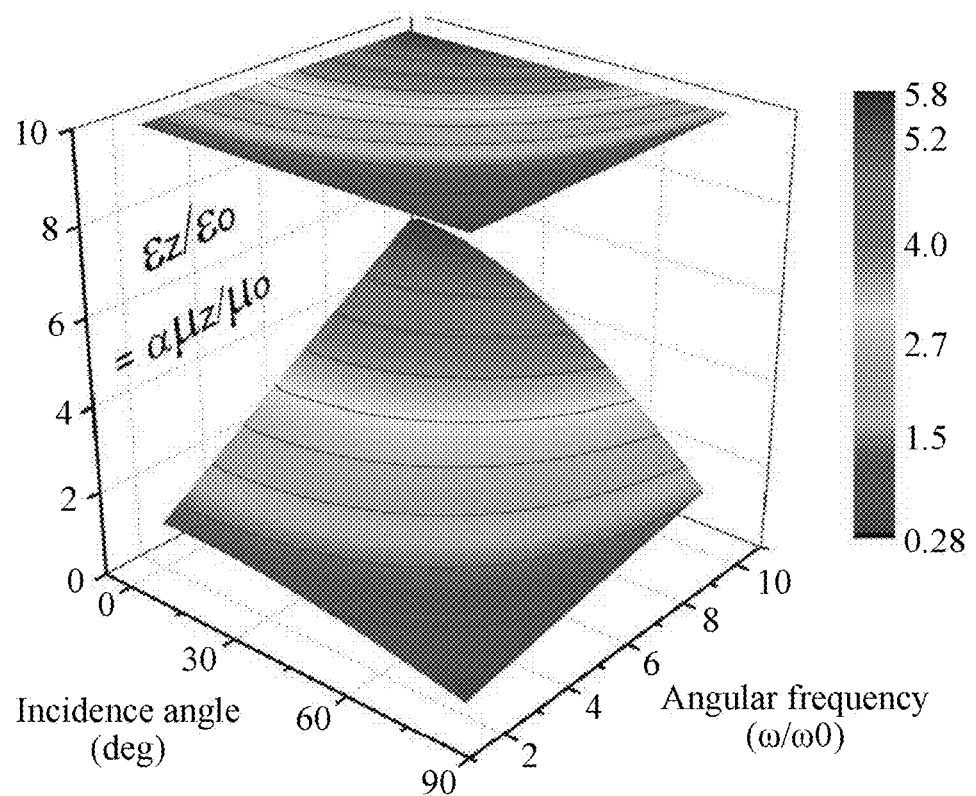

FIGS. 1A and 1B are graphs for explaining the relative permittivity and the relative magnetic permeability of a material implementing spatiotemporal dispersion according to one embodiment of the present disclosure and a substrate.

According to FIGS. 1A and 1B, the relative permittivity and relative magnetic permeability may change depending on change in the incidence angle and angular frequency of incident light.

In this case, the relative permittivity $\varepsilon/\varepsilon_0$ of a substrate for implementing the spatiotemporal dispersion of a material required for universal impedance matching may be 4, and the relative magnetic permeability $\mu/\mu_0$ of the substrate may be 1.

According to one embodiment of the present disclosure, the substrate may be any one of a high refractive index glass substrate, a high density polyethylene (HDPE) substrate, and a silicon substrate.

More specifically, the relative permittivity and the relative magnetic permeability may correspond to an anti-reflection state when Equation 1 below is satisfied.

$$\varepsilon_r = \frac{\pi \langle Y \rangle}{2\omega d \langle R \rangle}, \mu_r = \frac{\pi}{2\omega d \langle Y \rangle \langle R \rangle}, \qquad \text{[Equation 1]}$$

$$\frac{k^2}{\omega^2 \varepsilon_z} = \frac{\pi}{2\omega d \langle Y \rangle} \left( \frac{1}{\langle R \rangle} - \langle R \rangle \right),$$

$$\frac{k^2}{\omega^2 \mu_z} = \frac{\pi \langle Y \rangle}{2\omega d} \left( \frac{1}{\langle R \rangle} - \langle R \rangle \right),$$

wherein $\varepsilon_r$ and $\varepsilon_z$ represent relative permittivity, $\langle Y \rangle$ represents the geometric mean admittance of electromagnetic waves for first and second media, $\langle R \rangle$ represents the direction cosine, d represents the thickness of an anti-reflection coating, $\mu_r$ and $\mu_z$ represent relative magnetic permeability, k represents a wave number, and $\omega$ represents the angular frequency of electromagnetic waves.

More specifically, $\langle Y \rangle$ and $\langle R \rangle$ may be expressed by Equation 2.

$$\langle Y \rangle \equiv \sqrt{Y_1(0) Y_2(0)}, \langle R \rangle \equiv \sqrt{\cos\theta_1 \cos\theta_2}, \qquad \text{[Equation 2]}$$

$$Y_n(0) = \sqrt{\frac{\varepsilon_n}{\mu_n}}, \cos\theta_n = \sqrt{1 - \frac{k^2}{\varepsilon_n \mu_n \omega^2}}; n = 1, 2.,$$

wherein $\langle Y \rangle$ represents the geometric mean admittance of electromagnetic waves for first and second media, and $\langle R \rangle$ represents the direction cosine.

That is, the anti-reflection coating of the present disclosure may exhibit a relative permittivity and a relative magnetic permeability satisfying Equation 1 representing an anti-reflection state.

That is, the anti-reflection coating according to one embodiment of the present disclosure may be realized as a light-frequency anti-reflection coating with low angle and frequency dependence based on first and second distances of two layers designed at an optimized height.

The anti-reflection coating, according to one embodiment of the present disclosure, may serve to prevent reflection of white light between air and substrates, which may have a relative permittivity of four times that of air and the same relative magnetic permeability as air.

More specifically, in the present disclosure, it is assumed that electromagnetic waves are incident on a flat boundary between two different media having isotropic permittivity $\varepsilon_1$ and $\varepsilon_2$ and magnetic permeability $\mu_1$ and $\mu_2$, respectively.

In this case, when wave impedances do not match ($\mu_1/\varepsilon_1 \neq \mu_2/\varepsilon_2$), reflection may occur based on Fresnel equations.

To solve the above-mentioned impedance mismatch, a method of adding an anti-reflection coating between media may be considered.

A layer of an anti-reflection coating, added between two different media, may have permittivity and magnetic permeability satisfying Equation 3 below.

$$\varepsilon_{xx}=\varepsilon_{yy}=\varepsilon_r(z)\neq\varepsilon_{zz}=\varepsilon_z(z), \mu_{xx}=\mu_{yy}=\mu_r(z)\neq\mu_{zz}=\mu_z(z), \quad \text{[Equation 3]}$$

wherein $\varepsilon$ represents permittivity, $\mu$ represents magnetic permeability, and x, y, z represents spacing direction indices.

The shape of monochromatic plane waves diffused on an anti-reflection coating may be determined according to Equation 4 below.

$$\vec{E}=e^{ik_xx+ik_yy-i\omega t}\vec{E}(z), \vec{H}=e^{ik_xx+ik_yy-i\omega t}\vec{H}(z). \quad \text{[Equation 4]}$$

wherein E is related to an electric field, H is related to a magnetic field, k represents a wave number, and $\omega$ represents the angular frequency of the electromagnetic waves.

Equation 4 may be based on reduced Maxwell's equations.

In addition, the shape of monochromatic plane waves may be determined according to Equation 5 below.

$$\partial_z E_x = ik_x E_z + i\omega\mu_r H_y,$$

$$\partial_z E_y = ik_y E_z - i\omega\mu_r H_x,$$

$$ik_x E_y - ik_y E_x = i\omega\mu_z H_y,$$

$$\partial_z H_x = ik_x H_z - i\omega\varepsilon_r E_y,$$

$$\partial_z H_y = ik_y H_z + i\omega\varepsilon_r E_x,$$

$$ik_x H_y - ik_y H_x = -i\omega\mu_z E_y. \quad \text{[Equation 5]}$$

wherein E is related to an electric field, H is related to a magnetic field, k represents a wave number, $\omega$ represents the angular frequency of electromagnetic waves, E represents permittivity, and $\mu$ represents magnetic permeability.

A transverse magnetic (TM) mode may be determined when Hz=0 in Equation 5, and remaining field components may be expressed as two functions Y(z) and $\Phi_E(z)$ according to Equation 6 below.

$$E_x = -k_x \Phi_E,$$

$$E_y = -k_y \Phi_E,$$

$$E_z = (k^2/\omega\varepsilon_z)Y\Phi_E,$$

$$H_x = k_y Y\Phi_E,$$

$$H_y = -k_x Y\Phi_E, \quad \text{[Equation 6]}$$

wherein E is related to an electric field, H is related to a magnetic field, k represents a wave number, $\omega$ represents the angular frequency of the electromagnetic waves, represents permittivity, $\mu$ represents magnetic permeability, Y(z) represents an admittance function, and $\Phi_E(z)$ represents a field component.

According to Equation 6, when $k^2$ is $k_x^2+k_y^2$, Equation 7 may be derived using Maxwell's equations, and k represents the angle of light or electromagnetic waves incident between two different media.

[Equation 7]

$$i\omega\varepsilon_r = \partial_z Y + (i\omega\mu_r - ik^2/\omega\varepsilon_z)Y^2 \quad \text{(a)}$$

$$\partial_z \ln \Phi_E = (i\omega\mu_r - ik^2/\omega\varepsilon_z)Y, \quad \text{(b)}$$

wherein k represents an incidence angle, $\omega$ represents the angular frequency of the electromagnetic waves, $\varepsilon$ represents permittivity, $\mu$ represents magnetic permeability, Y(z) represents an admittance function, and $\Phi_E(z)$ represents a field component.

In addition, electric field components in a transverse electric (TE) mode may be determined using Equation 8 below.

$$E_x = k_y Z\Phi_H,$$

$$E_y = -k_x Z\Phi_H,$$

$$H_x = k_x \Phi_H,$$

$$H_y = k_y \Phi_H,$$

$$H_z = -(k^2\omega\mu_z)Z\Phi_H \quad \text{[Equation 8]}$$

wherein, when Ez=0 in Equation 5, remaining field components are represented as two functions Z(z) and $\Phi_H(z)$ and expressed by Equation 9, E is related to an electric field, H is related to a magnetic field, k represents a wave number, $\omega$ represents the angular frequency of the electromagnetic waves, c represents permittivity, $\mu$ represents magnetic permeability, Z(z) represents an impedance function, and $\Phi_H(z)$ represents a field component.

[Equation 9]

$$\omega\mu_r = \partial_z Z + (i\omega\varepsilon_r - ik^2/\omega\mu_z)Z^2 \quad \text{(a)}$$

$$\partial_z \ln \Phi_H = (i\omega\varepsilon_r - ik^2/\omega\mu_z)Z, \quad \text{(b)}$$

wherein k represents an incidence angle, $\omega$ represents the angular frequency of the electromagnetic waves, $\varepsilon$ represents permittivity, $\mu$ represents magnetic permeability, Z(z) represents an impedance function, and $\Phi_H(z)$ represents a field component.

In addition, Y and Z as parameters for determining the permittivity and magnetic permeability of an anti-reflection coating may be determined using (a) of Equation 7 and (a) of Equation 9.

In the anti-reflection coating according to one embodiment of the present disclosure, when TM-polarized incident plane waves are completely transmitted without being reflected at the interface, matching of the admittance function Y is required to maintain continuity of tangential field components, and matching of the admittance function Y may be expressed by Equation 10 below.

$$Y(0) = Y_1(k) \equiv \frac{\omega\varepsilon_1}{\sqrt{\varepsilon_1\mu_1\omega^2 - k^2}}, \quad \text{[Equation 10]}$$

$$Y(d) = Y_2(k) \equiv \frac{\omega\varepsilon_2}{\sqrt{\varepsilon_2\mu_2\omega^2 - k^2}},$$

wherein Y represents an admittance function, k represents an incidence angle, $\omega$ represents the angular frequency of electromagnetic waves, $\varepsilon$ represents permittivity, and $\mu$ represents magnetic permeability.

An impedance function required for impedance matching without reflection in a TE mode may be expressed by Equation 11 below as matching of Z.

$$Z(0) = \frac{\omega\mu_1}{\sqrt{\varepsilon_1\mu_1\omega^2 - k^2}},$$

$$Z(d) = \frac{\omega\mu_2}{\sqrt{\varepsilon_2\mu_2\omega^2 - k^2}},$$

[Equation 11]

wherein Z represents an impedance function, k represents an incidence angle, ω represents the angular frequency of the electromagnetic waves, ε represents permittivity, and μ represents magnetic permeability.

In addition, an additional condition imposed on the admittance function and the impedance function from the viewpoint that the TM mode and the TE mode are limited in the vertical incidence angle may be Equation 12 below.

$$Y(z)|_{k=0} = Z(z)^{-1}|_{k=0},$$

[Equation 12]

wherein Y represents an admittance function, Z represents an impedance function, and k represents an incidence angle.

Equations 10 to 12 are the impedance matching conditions, and the anti-reflection coating according to one embodiment of the present disclosure satisfies the conditions of Equations 10 to 12. Thus, the anti-reflection coating may satisfy the conditions for completely preventing reflection of incident light.

That is, incident light may be linear superposition of the TE mode and TM mode components.

Therefore, the anti-reflection coating according to one embodiment of the present disclosure may transmit all incident light without reflecting the incident light regardless of the characteristics of incident light such as frequency, polarization, and incidence angle.

In addition, εr, εz, μr, and μz parameters are real numbers, and by setting the parameters to constants, values related to Maxwell's equations in Equations 7 and 9 satisfying the impedance matching condition of Equations 10 to 12 may be calculated.

For example, the anti-reflection coating of the present disclosure satisfies the conditions of Equations 1 and 2, and thus, may prevent reflection of incident light regardless of incidence angle and frequency. In addition, the anti-reflection coating may completely prevent reflection of non-absorptive and non-uniform white light and transmit all the white light without reflection.

The anti-reflection coating according to one embodiment of the present disclosure may be realized as an anomalous dispersive medium that satisfies the condition of Equation 1 corresponding to theoretical values and that does not absorb incident light.

Figure 1C:
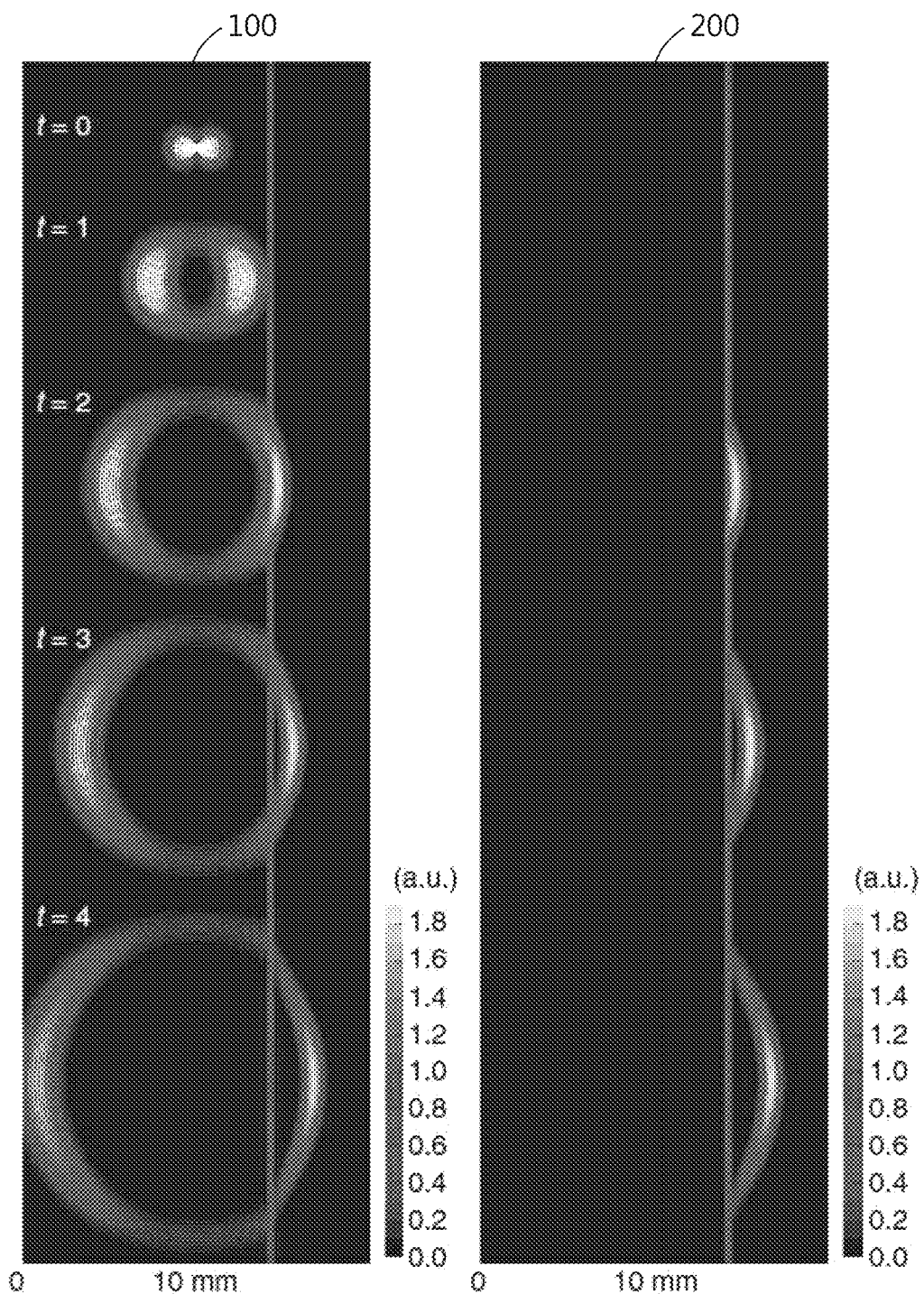
FIG. 1C includes images showing the extent to which an anti-reflection coating, according to one embodiment of the present disclosure, prevents reflection of incident light.

FIG. 1C includes images showing the extent to which an anti-reflection coating according to one embodiment of the present disclosure prevents reflection of incident light.

Referring to FIG. 1C, light 100 represents both incident light and scattered (reflected or transmitted) light, and light 110 represents only scattered (reflected or transmitted) light.

In FIG. 1C, the light 100 and the light 110 may be compared.

Since the light 110 does not exhibit reflected light in scattered light, the light 110 may exhibit an anti-reflection effect corresponding to the anti-reflection effect of the present disclosure.

Figure 2A:
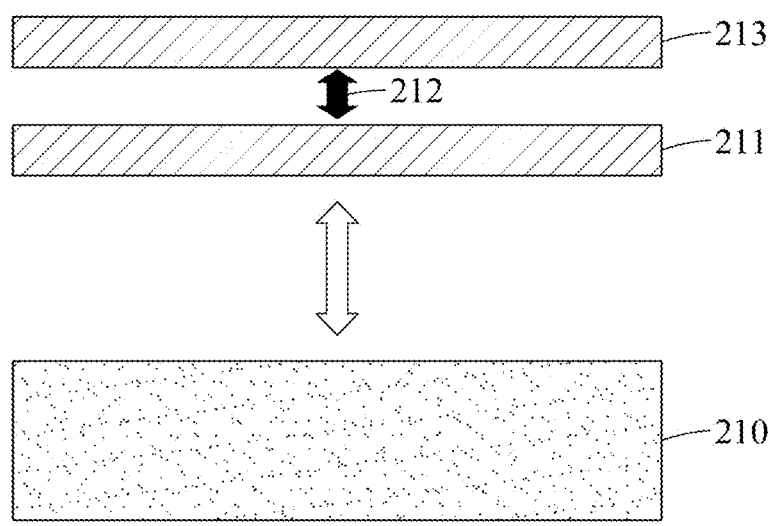
FIGS. 2A and 2B are diagrams showing the structure formation of an anti-reflection coating according to one embodiment of the present disclosure.
Figure 2B:
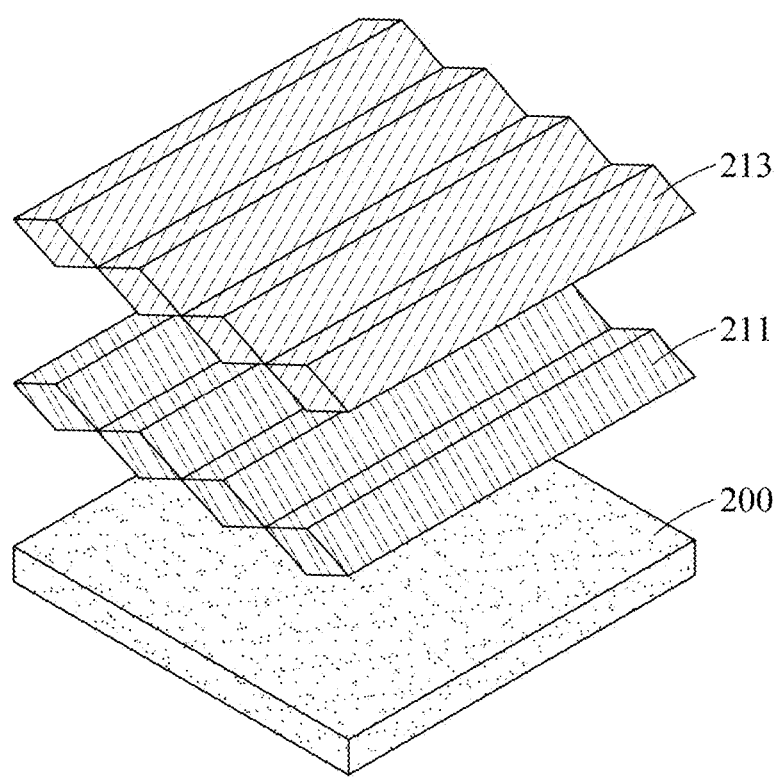

FIGS. 2A and 2B are diagrams showing the structure formation of an anti-reflection coating according to one embodiment of the present disclosure.

Figure 2C:
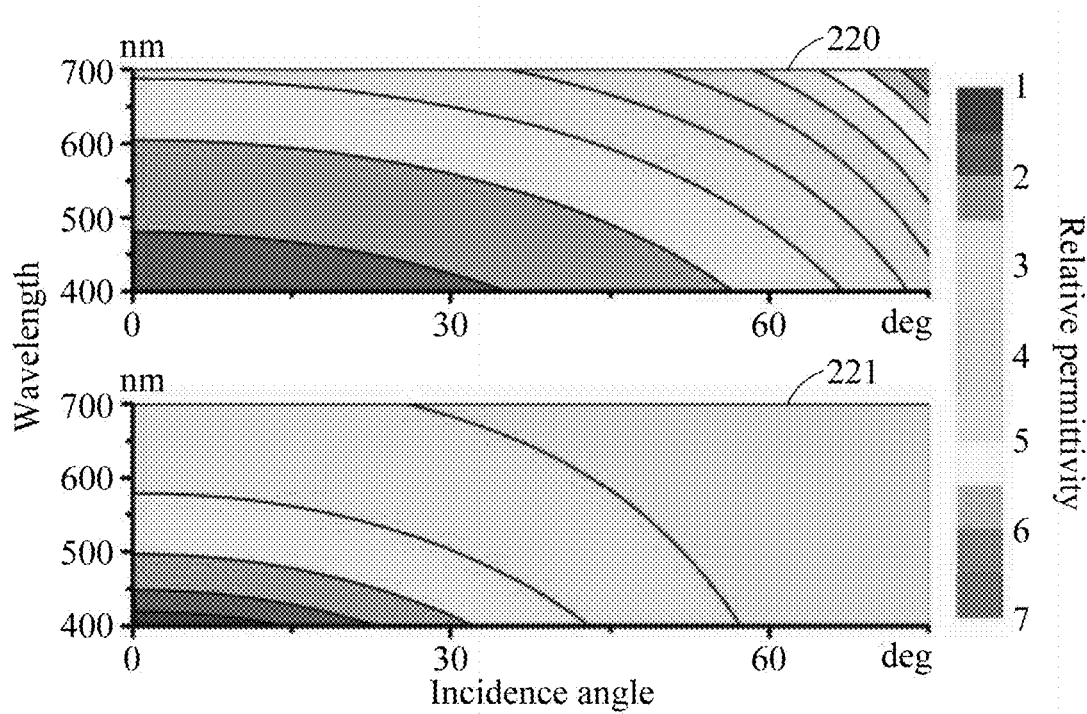
FIG. 2C includes graphs showing spatiotemporal dispersion according to one embodiment of the present disclosure.

FIG. 2C include graphs for comparing the spatiotemporal dispersion of anti-reflection coating according to one embodiment of the present disclosure and a spaced-apart bilayer.

FIG. 2A is a schematic diagram of the metamaterial forming a structural double layer according to one embodiment of the present disclosure, and FIG. 2B is a stereoscopic view of the anti-reflection coating with tailored surface structure in subwavelength size from the structural double layer metamaterial.

Referring to FIG. 2A, the anti-reflection coating may be composed of first and second layers 211 and 213 with a subwavelength distance 212, forming a structural double layer metamaterial.

According to one embodiment of the present disclosure, the second layer 213 may be positioned on the first layer 211 to be spaced apart from the first layer 211 by a subwavelength distance 212.

That is, the first and second layers 211 and 213 may be formed of a metamaterial forming a structural double layer 210 from the homogenization principle.

Referring to FIG. 2C, the abscissa of the graph represents incidence angle, and the ordinate of the graph represents wavelength. The graphs show the spatiotemporal dispersion of relative permittivity depending on change in incidence angle and wavelength.

The graph 220 shows space-time dispersion of relative permittivity of anti-reflection coating layer corresponding to ideal universal impedance matching, and the graph 221 shows space-time dispersion of relative permittivity formed by the spaced-apart bilayer of two media with a relative permittivity of 8 times air.

According to one embodiment of the present disclosure, the ideal universal impedance matching may require an anomalous dispersive medium with no absorption, and the structural double layer may be realized as an anomalous dispersive medium that does not absorb incident light.

That is, the structural double layer may perform an anti-reflection function in accordance with the universal impedance matching (UIM) theory.

According to one embodiment of the present disclosure, the structural double layer may block reflection of incident light between two materials having different optical or electromagnetic properties regardless of at least one of the frequency, incidence angle, and polarization direction of light.

For example, the structural double layer may implement impedance matching between two different materials.

In addition, the structural double layer may perform an anti-reflection function by introducing a bilayer structure into two medium layers to achieve impedance matching regardless of the incidence angle of light.

Referring to FIG. 2B, the anti-reflection coating may be formed on the substrate 200, and may be composed of the first and second layers 211 and 213.

In the first and second layers 211 and 213, the material type, thickness, and first and second distances may be changed depending on the type of the substrate.

As described above, the first and second layers 211 and 213 form the structural double layer.

In addition, the thicknesses of the first and second layers 211 and 213 may be changed depending on the type of the substrate, and may be formed in a lattice structure in which plural rectangles are assembled according to the wavelength in order to fit the ideal universal impedance matching.

For example, when the first and second layers 211 and 213 are formed on the substrate 200, the first and second layers 211 and 213 may be formed to have a thickness of 25 nm and a lattice length of about 50 nm.

In this case, the first distance may be 55 nm, the second distance may be 105 nm, and the substrate 200 may have a dielectric constant of 4. In addition, the first layer 211 may have a dielectric constant of 10, and the second layer 213 may have a dielectric constant of 2.5 or more.

According to another embodiment, the thicknesses, angles, shapes, and first and second distances of the first and second layers 211 and 213 may be calculated using COMSOL Multiphysics.

According to one embodiment of the present disclosure, in the structural double layer in which the first and second layers 211 and 213 are spaced apart, accurate spatiotemporal dispersion may be realized by partially changing the surface structure of the structural double layer based on wavelength.

According to the present disclosure, an anti-reflection coating that blocks reflection of light or electromagnetic waves regardless of the frequency, incidence angle, and polarization direction of light may be formed.

According to the present disclosure, in solar cell panels, optical lenses, and various optical devices, energy loss due to reflection of light may be reduced, and energy transfer efficiency may be improved.

For example, sunlight may be efficiently collected regardless of change in the incidence angle of sunlight, thereby improving the efficiency of solar power generation.

According to the present disclosure, the structural double layer may realize arbitrary spatiotemporal dispersion for impedance matching based on the spaced apart structure of the first and second layers 211 and 213 with their optimized surface structure.

In addition, the spaced-apart bilayer according to one embodiment of the present disclosure may exhibit space-time dispersion corresponding to ideal universal impedance matching regardless of change in incidence angle.

That is, the anti-reflection coating according to one embodiment of the present disclosure may be realized as a metamaterial having spatiotemporal dispersion through a space having a size smaller than a wavelength size between the first and second layers and an surface lattice structure having a lattice length smaller than a wavelength size.

The present disclosure may reduce the size of a device, which is required for an anti-reflection coating, by designing an anti-reflection coating that is not dependent on incidence angle, compared to an anti-reflection coating having a thickness larger than wavelength such as a multilayer anti-reflection coating.

Figure 3A:
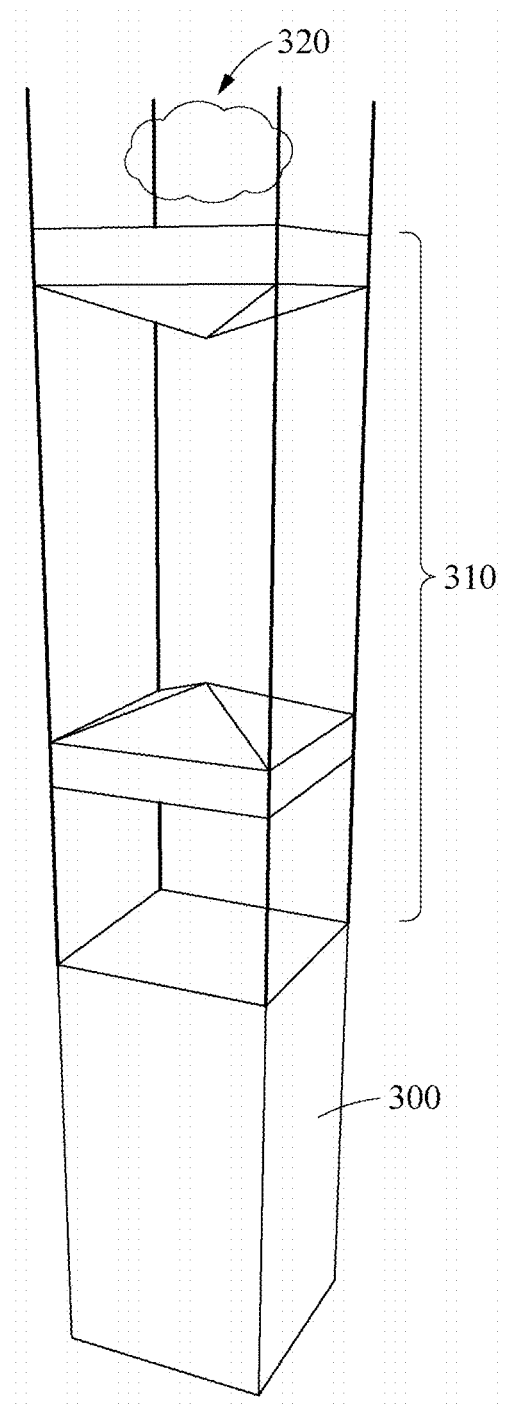

FIGS. 3A and 3B are diagrams showing an example in which an anti-reflection coating according to one embodiment of the present disclosure is formed on a high refractive index glass substrate.

Referring to FIG. 3A, an anti-reflection coating 310 is formed on a high refractive index glass substrate 300. That is, the anti-reflection coating 310 is positioned between the high refractive index glass substrate 300 and air 320 corresponding to different media to block reflection of incident light.

The anti-reflection coating 310 formed on the high refractive index glass substrate 300 will be described in detail with reference to FIG. 3B.

Referring to FIG. 3B, the anti-reflection coating 310 may be positioned between a substrate 300 and the air 320, and may include first and second layers 312 and 314. The first layer 312 may be spaced apart from the substrate 300 by a first distance 311, and the second layer 314 may be spaced apart from the first layer 312 by a second distance 313.

For example, the substrate 300 may include at least one of a LASF9 glass substrate and a high refractive index glass substrate.

According to one embodiment of the present disclosure, when the substrate 300 is a high refractive index glass substrate, the first and second layers 312 and 314 may be formed using tantalum oxide ($Ta_2O_5$), and the first and second distances 311 and 313 may be formed of a porous material.

For example, the porous material may include porous magnesium fluoride ($MgF_2$). In this case, the porous material may provide the same effect as an air layer while spatially separating the first and second layers 312 and 314.

Since the anti-reflection coating according to one embodiment of the present disclosure is based on the porous material, the anti-reflection coating may receive light with a low effective refractive index when light enters vertically.

In addition, as the incidence angle increases, the anti-reflection coating may provide an effect of spatially filling a medium when light is viewed.

In addition, when the substrate 300 is a high refractive index glass substrate, the thickness ratio of the first layer 312 to the second layer 314 may be about 1:5, and the second distance 313 may be 3.5 times the first distance 311.

For example, the length from the substrate 300 to the second layer 314 may be 160 nm.

In addition, the first layer 312 may be formed to have a thickness of about 21 nm. In this case, after the first layer 312 is formed to a thickness of 13 nm, the thickness of the first layer 312 may be further increased by about 8 nm toward the second layer 314.

In this case, the additionally-formed first layer 312 may exhibit a quadrangular pyramidal shape. In this case, the quadrangular pyramidal shape may also represent a three-dimensional shape.

For example, the second layer 314 may be formed to have a thickness of about 4 nm. In this case, after the second layer 314 is formed to a thickness of 2 nm, the thickness of the second layer 314 may be further increased by about 2 nm toward the first layer 312.

According to one embodiment of the present disclosure, the first distance 311 may be about 20 nm, and the second distance 313 may be about 100 nm.

In addition, the anti-reflection coating 310 may be formed as a light-frequency anti-reflection coating having a small angle dependence by forming a specific structure in the first and second layers 312 and 314.

In this case, the anti-reflection coating 310 may realize anti-reflection satisfying the permittivity and magnetic permeability dispersion graph shown in FIG. 1.

In addition, the anti-reflection coating 310 may be realized as an anomalous dispersive medium that does not absorb light or electromagnetic waves based on the first and second distances 311 and 313.

That is, the anti-reflection coating 310 may realize spatiotemporal dispersion corresponding to universal impedance matching based on the first and second distances 311 and 313.

Figure 4A:
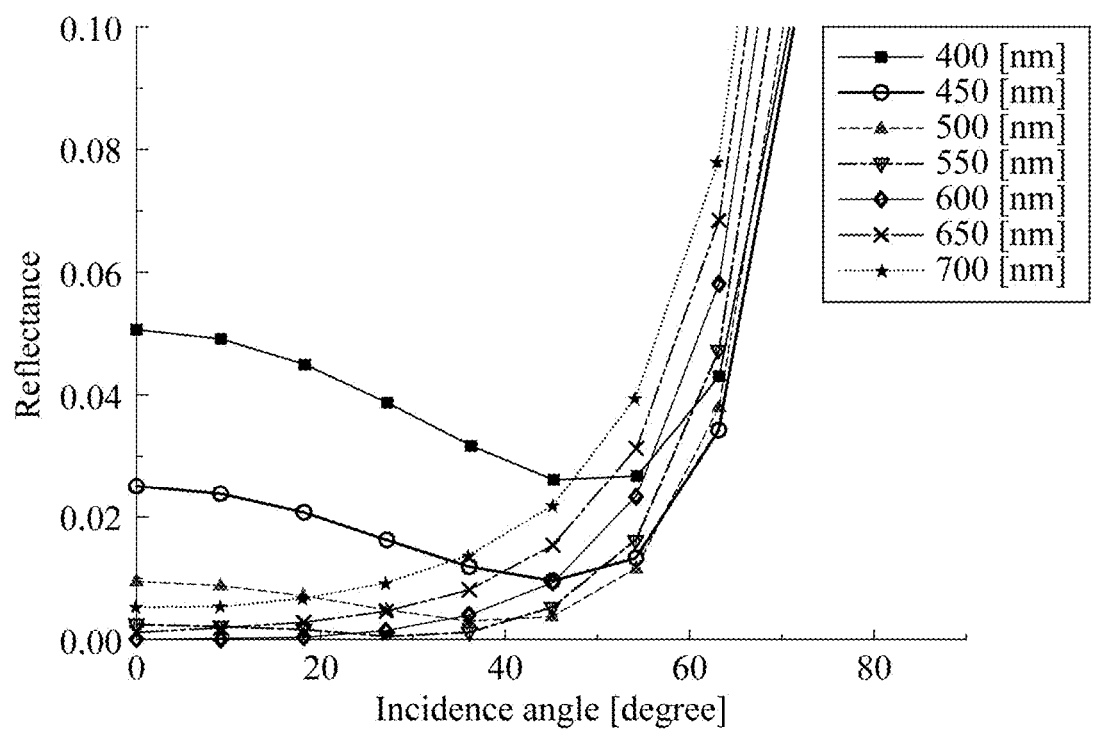
FIG. 4A is a graph showing the reflectance of a quarter-wave anti-reflection coating according to the prior art.
Figure 4B:
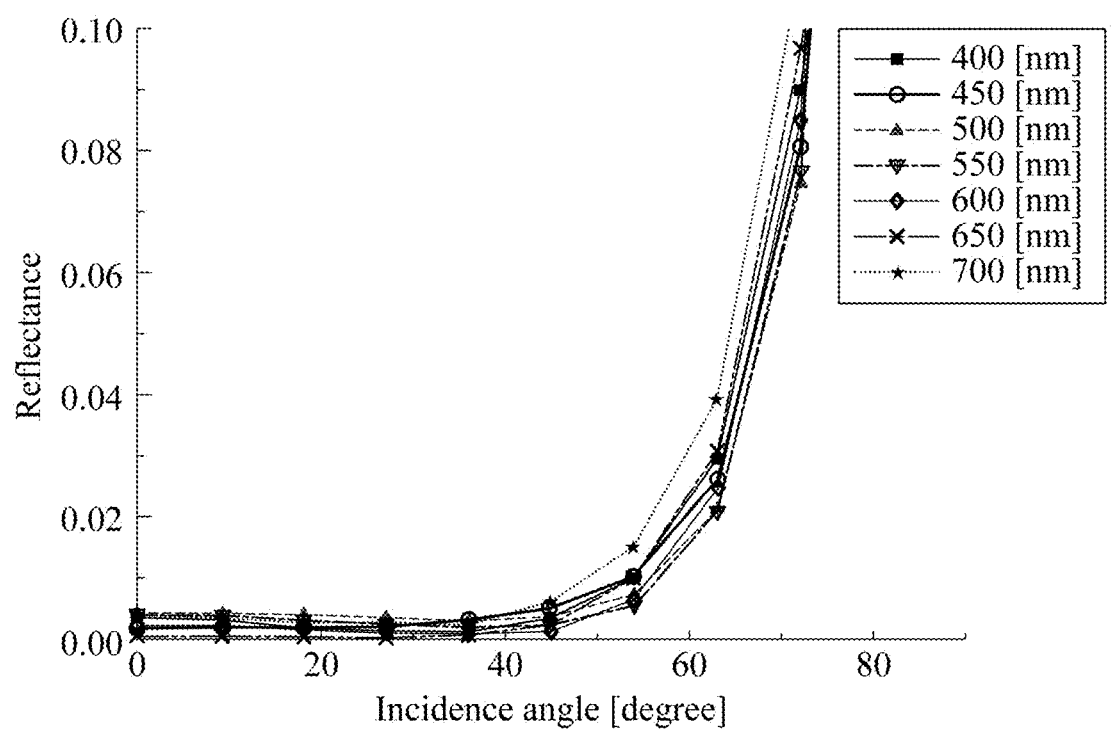
FIG. 4B is a graph showing the reflectance of an anti-reflection coating according to one embodiment of the present disclosure.

FIG. 4A is a graph showing the reflectance of a quarter-wave anti-reflection coating according to the prior art, and FIG. 4B is a graph showing the reflectance of an anti-reflection coating according to one embodiment of the present disclosure.

Referring to FIGS. 4A and 4B, the horizontal variable of the graph represents incidence angle, and the vertical variable represents reflectance.

Comparing FIGS. 4A and 4B, as incidence angle changes, the reflectance of a quarter-wave anti-reflection coating shows a large change.

In addition, the anti-reflection coating according to one embodiment of the present disclosure may prevent reflection constantly regardless of change in incidence angle.

In this case, values calculated through the graph may correspond to the reflectance of TE waves and TM waves.

In this case, the reflectance may represent average reflectance, and the reflectance may be determined based on Equation 13 below.

$$R=(R_{TM}+R_{TE})/2, \quad \text{[Equation 13]}$$

wherein R represents reflectance, TM represents TM waves, and TE represents TE waves.

As described above, the anti-reflection coating according to one embodiment of the present disclosure may prevent reflection constantly regardless of change in incidence angle.

Therefore, when the anti-reflection coating of the present disclosure is applied to a display, the anti-reflection coating may improve energy efficiency by reducing energy loss due to reflection from the protective glass of the display.

In addition, since the anti-reflection coating of the present disclosure prevents reflection constantly regardless of change in incidence angle, when the anti-reflection coating is applied to panels for solar generation, the anti-reflection coating may reduce energy loss in panels for solar generation by preventing reflection of sunlight.

Figure 5A:
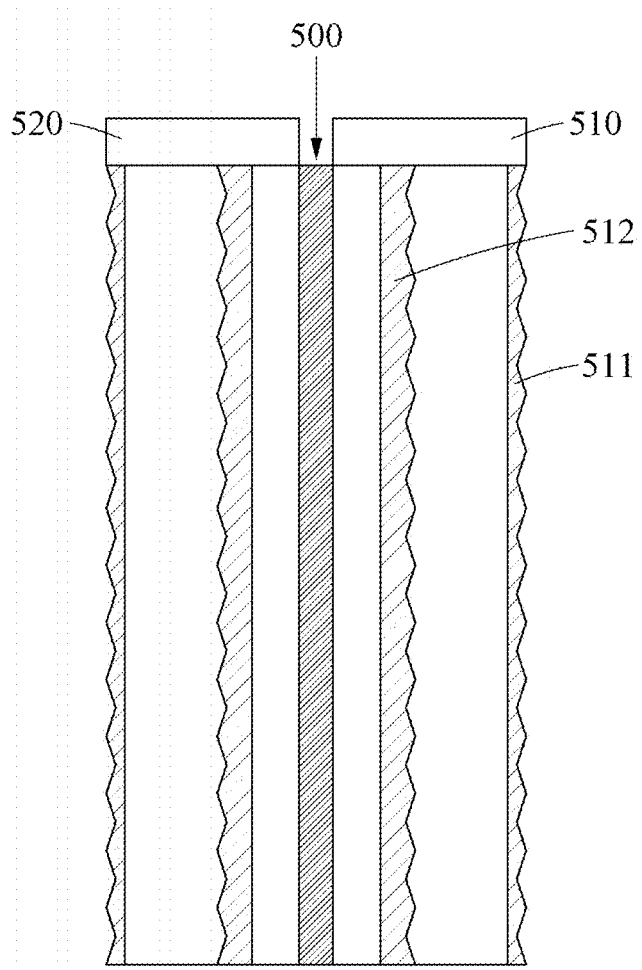
FIGS. 5A and 5B are diagrams showing an example in which an anti-reflection coating according to one embodiment of the present disclosure is formed on a high density polyethylene substrate.
Figure 5B:
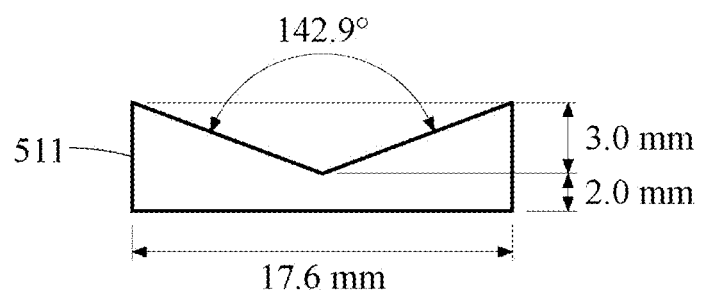
Figure 5B:
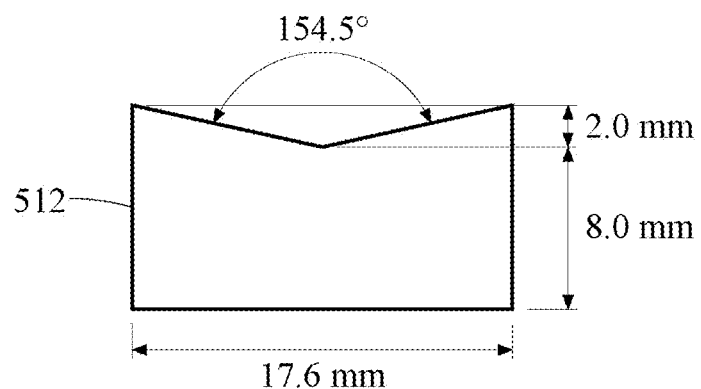

FIGS. 5A and 5B are diagrams showing an example in which an anti-reflection coating according to one embodiment of the present disclosure is formed on a high density polyethylene substrate.

Specifically, in FIGS. 5A and 5B, an anti-reflection coating structure in which a high density polyethylene (HDPE) substrate is used and which is optimized for TM waves is exemplified.

Referring to FIG. 5A, first and second anti-reflection coatings 510 and 520 may be positioned on a substrate 500.

The structures of the first and second anti-reflection coatings 510 and 520 are the same, and will be described using the first anti-reflection coating 510.

The first anti-reflection coating 510 may include first and second layers 512 and 511.

For example, the first layer 512 may be positioned on the substrate 500 to be spaced apart from the substrate 500 by a first distance, and the second layer 511 may be positioned on the first layer 512 to be spaced apart from the first layer 512 by a second distance.

The first and second layers may be formed of a metamaterial forming a structural double layer, and may realize spatiotemporal dispersion with respect to incident light.

According to one embodiment of the present disclosure, in the first anti-reflection coating 510, when the substrate 500 is a high density polyethylene substrate, each of the first and second layers 512 and 511 may include a plurality of unit cells.

The anti-reflection coating structure in which a high density polyethylene (HDPE) substrate is used and which is optimized for TM waves may be realized in a microwave region.

According to one embodiment of the present disclosure, when the substrate of the anti-reflection coating is a high density polyethylene (HDPE) substrate, the first and second layers 512 and 511 may be formed using the same material as the substrate, and the first and second distances may be formed of Styrofoam.

A plurality of unit cells will be described with reference to FIG. 5B.

According to one embodiment of the present disclosure, in the first anti-reflection coating 510, the second distance may be two times the first distance.

That is, when the thickness of the substrate 500 is about 10 mm, the first distance may be about 15 mm, and the second distance may be about 30 mm.

For example, when the substrate is a high density polyethylene substrate, the relative permittivity of the structural double layer may be equal to the relative permittivity of the substrate, and may be 2.26.

Referring to FIG. 5B, a plurality of unit cells included in the anti-reflection coating according to one embodiment of the present disclosure is exemplified. The unit cells may constitute the first and second layers 512 and 511, respectively.

According to one embodiment of the present disclosure, the lower part of the unit cells may be flat, and the upper part of the unit cells may form a predetermined inclination angle.

According to one embodiment of the present disclosure, the second layer 511 may be formed to have a length of about 17.6 mm and a thickness of about 5 mm, and may include both inclined ends. In this case, the two ends may form a slope of about 142.9°.

According to one embodiment of the present disclosure, the first layer 512 may be formed to have a length of about 17.6 mm and a thickness of about 10 mm, and may include both inclined ends. In this case, the two ends may form a slope of about 154.5°.

The unit cells of the present disclosure may include an anti-reflection coating using a high refractive index glass substrate.

FIGS. 6A to 6D are graphs showing the reflectance of an anti-reflection coating according to one embodiment of the present disclosure formed on a high density polyethylene substrate.

In FIGS. 6A to 6D, simulation values and experimental values for the reflectance of the anti-reflection coating formed on a high density polyethylene substrate are shown.

Figure 6A:
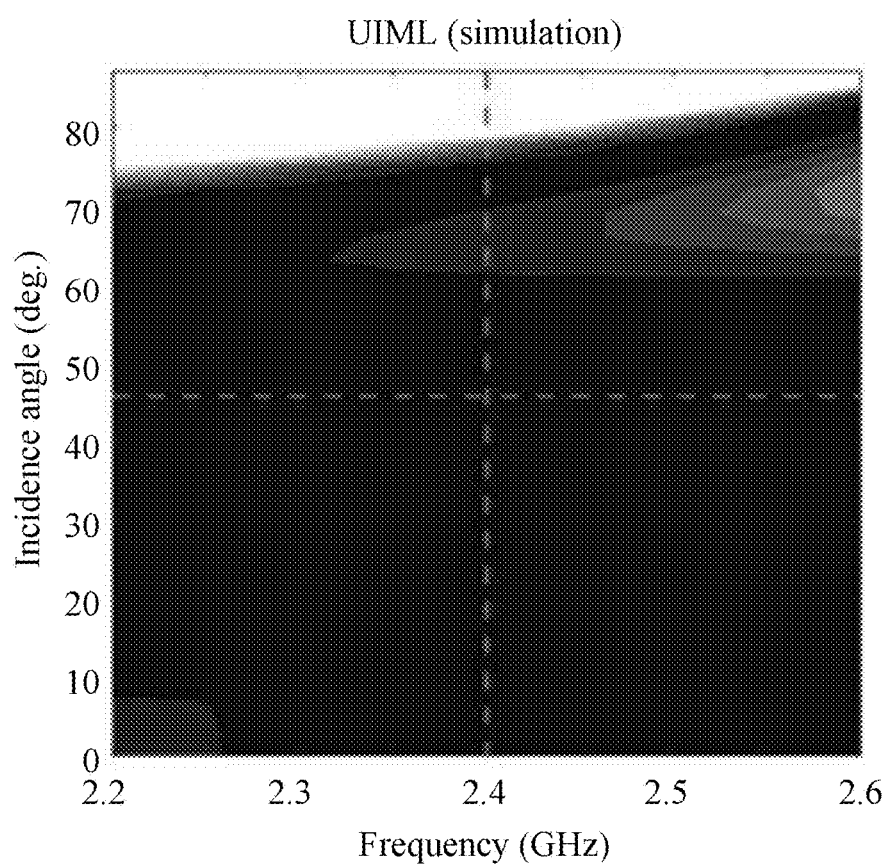
Figure 6B:
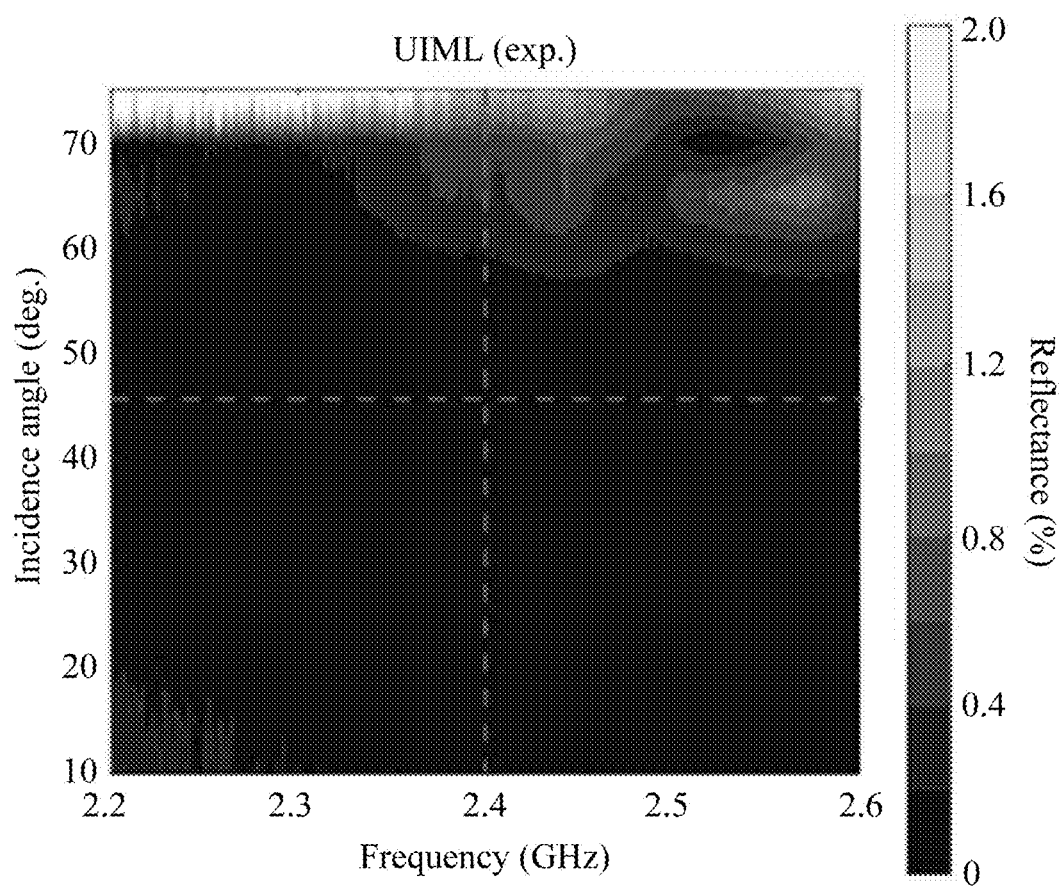

FIGS. 6A and 6B show that the anti-reflection coating formed on a high density polyethylene substrate prevents reflection of light, similar to the results of the simulation.

FIG. 6C shows frequency-dependent reflectance at an incidence angle of 45° for a plurality of anti-reflection coatings. That is, dependence of reflectance on frequency is compared.

Referring to FIG. 6C, indicators 601 and 602 may correspond to reflectance when only a high density polyethylene substrate is present, indicators 603 and 604 may correspond to reflectance when an anti-reflection coating is formed on a high density polyethylene substrate, and an indicator 605 may correspond to reflectance when a quarter-wave anti-reflection coating is present.

In addition, the indicators 601 and 603 may correspond to the experimentally measured results, and the indicators 602, 604, and 605 may correspond to the results of simulation of electromagnetic waves.

Figure 6D:
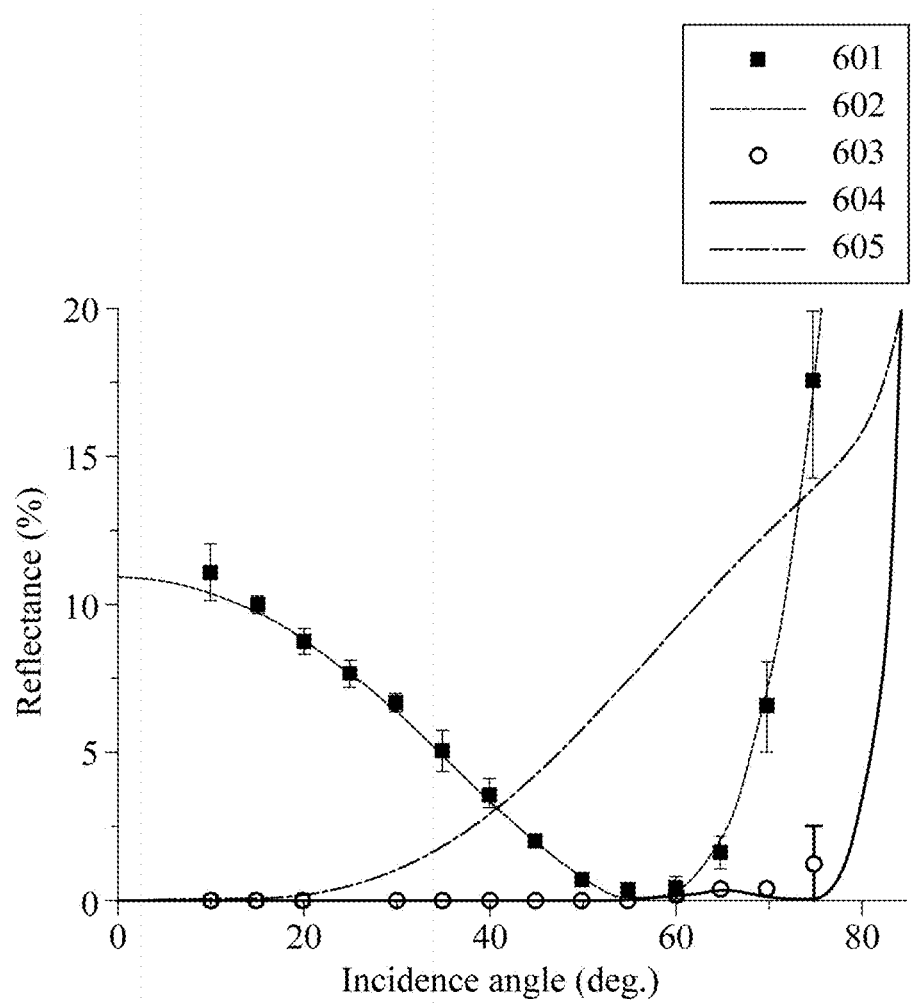

FIG. 6D shows incidence angle-dependent reflectance at a frequency of 2.4 GHz for a plurality of anti-reflection coatings. That is, dependence of reflectance on an incident angle is compared.

Referring to FIG. 6D, the indicators 601 and 602 may correspond to reflectance when only a high density polyethylene substrate is present, the indicators 603 and 604 may correspond to reflectance when an anti-reflection coating is formed on a high density polyethylene substrate, and the indicator 605 may correspond to reflectance when a quarter-wave anti-reflection coating is present.

In addition, the indicators 601 and 603 may correspond to the experimentally measured results, and the indicators 602, 604, and 605 may correspond to the results of simulation of electromagnetic waves.

In addition, when the anti-reflection coating according to one embodiment of the present disclosure is applied to military equipment, reflection of electromagnetic waves generated from the military equipment may be prevented to avoid radar detection.

Figure 7:
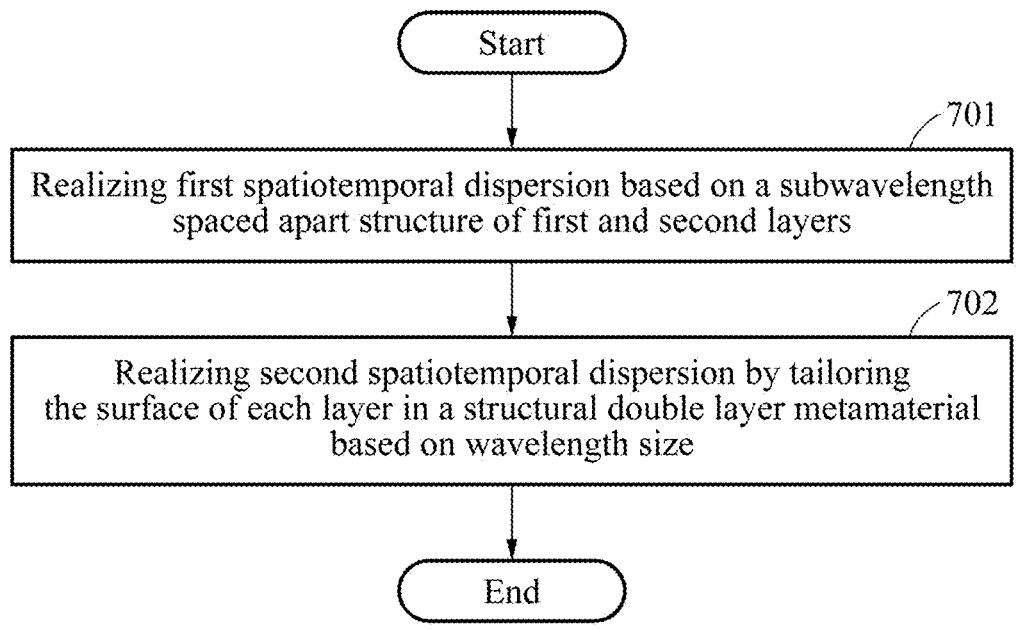
FIG. 7 is a flowchart illustrating a method of forming an anti-reflection coating according to one embodiment of the present disclosure.

FIG. 7 is a flowchart illustrating a method of forming an anti-reflection coating according to one embodiment of the present disclosure.

Specifically, FIG. 7 is a flowchart of a method of forming an anti-reflection coating capable of completely blocking reflection of light regardless of light frequency and incidence angle of light and transmitting all light into a medium.

Referring to FIG. 7, in step 701, first and second layers are formed on a substrate, and a first spatiotemporal dispersion based on the spaced apart structure of the first and second layers may be realized.

That is, the method of forming the anti-reflection coating according to one embodiment of the present disclosure may use the spaced apart structure of various media to realize approximate spatiotemporal dispersion. In this case, the approximate spatiotemporal dispersion may be referred to as an arbitrary spatiotemporal dispersion or a first spatiotemporal dispersion.

In step 702, the method of forming the anti-reflection coating according to one embodiment of the present disclosure may include tailoring the surface of each layer in a structural double layer material based on the size of wavelength to realize a second spatiotemporal dispersion.

That is, in the method of forming the anti-reflection coating, by designing the structural double layer with a small structure in comparison with the wavelength size, second spatiotemporal dispersion may be realized so that the anti-reflection layer approaches the theoretically required spatiotemporal dispersion.

In this case, the second spatiotemporal dispersion may be more consistent with equations representing theoretical spatiotemporal dispersion compared to the first spatiotemporal dispersion.

The present disclosure may provide a thin material that completely blocks reflection of light between two media having different refractive indices, regardless of the incidence angle and frequency of incident light, using two layers for spatiotemporal dispersion.

In addition, according to the present disclosure, by providing a structure to two medium layers, impedance matching may be achieved regardless of incidence angle of light, thereby providing a systematic direction for the design of the anti-reflection coating.

According to the present disclosure, an anti-reflection coating that blocks reflection of light or electromagnetic waves regardless of the frequency, incidence angle, and polarization direction of light can be formed.

According to the present disclosure, in solar cell panels, optical lenses, and various optical devices, energy loss due to reflection of light can be reduced, and energy transfer efficiency can be improved.

For example, sunlight can be efficiently collected regardless of change in the incidence angle of sunlight, thereby improving the efficiency of solar power generation.

The present disclosure can reduce the size of a device, which is required for an anti-reflection coating, by designing an anti-reflection coating that is not dependent on incidence angle, compared to an anti-reflection coating having a thickness larger than wavelength such as a multilayer anti-reflection coating.

The present disclosure can provide a thin material that completely blocks reflection of light between two media having different refractive indices, regardless of the incidence angle, frequency, and polarization direction of incident light, using two layers for spatiotemporal dispersion.

According to the present disclosure, by providing a structure to two medium layers, impedance matching can be achieved regardless of incidence angle of light, thereby providing a systematic direction for the design of the anti-reflection coating.

The present disclosure can improve energy efficiency by reducing energy loss due to reflection from the protective glass of a display.

The methods according to claims of the present disclosure or the embodiments described in the specification may be implemented in hardware, software, or a combination of hardware and software.

The software may be stored in a computer-readable storage medium. When executed by at least one program (software module) or at least one processor, the computer-readable storage medium stores at least one program that includes instructions that cause the electronic device to perform the method of the present disclosure.

Such software may be stored on optical or magnetic readable media, such as compact disc-ROM (CD-ROM), digital versatile discs (DVDs), magnetic disks, or magnetic tapes, in the form of a volatile storage device or a non-volatile storage device such as read only memory (ROM), or in the form of a memory such as random access memory (RAM), memory chips, or integrated circuits.

The storage device and storage medium are machine-readable storage means suitable for storing, when executed, programs containing instructions implementing one embodiment.

In the above-described specific embodiments, elements included in the invention are expressed singular or plural in accordance with the specific embodiments shown.

It should be understood, however, that the singular or plural representations are to be chosen as appropriate to the situation presented for the purpose of description and that the above-described embodiments are not limited to the singular or plural constituent elements. The constituent elements expressed in plural may be composed of a single number, and constituent elements expressed in singular form may be composed of a plurality of elements.

In addition, the present disclosure has been described with reference to exemplary embodiments, but it should be understood that various modifications may be made without departing from the scope of the present disclosure.

Therefore, it should be understood that there is no intent to limit the disclosure to the embodiments disclosed, rather, the disclosure is to cover all modifications, equivalents, and alternatives falling within the spirit and scope of the disclosure as defined by the claims.

[Description of Symbols]

| | |
|---|---|
| 200: SUBSTRATE | 211: FIRST LAYER |
| 213: SECOND LAYER | 212: DISTANCE BETWEEN LAYERS |
| 210: STRUCTURAL DOUBLE LAYER METAMATERIAL | |

What is claimed is:

1. An anti-reflection coating, comprising:
a first layer positioned on a substrate to be spaced apart from the substrate by a first distance; and
a second layer positioned on the first layer to be spaced apart from the first layer by a second distance,
wherein a combination of the first layer and the second layer with a subwavelength distance forms a structural double layer comprising a single metamaterial which has spatiotemporal dispersion,
wherein the spatiotemporal dispersion refers to electromagnetic properties, which vary depending on both of a frequency and an incidence angle using spatial non-locality of an electromagnetic wave reaction of an incident light,
wherein the structural double layer shows an anomalous dispersion where a refractive index deduced from the electromagnetic properties decreases as the frequency increases,
wherein the structural double layer does not absorb the incident light,
wherein the electromagnetic wave reaction is an electromagnetic response of the structural double layer to electromagnetic waves of the incident light,
wherein each of the first layer and second layer comprises a plurality of unit cells, and
wherein a lower part of the plurality of unit cells is flat, and an upper part of the plurality of the unit cells forms a predetermined inclination angle.

2. The anti-reflection coating according to claim 1, wherein the structural double layer blocks reflection of the incident light between two different materials regardless of the frequency, the incidence angle, and a polarization direction of the incident light,
wherein the two different materials are an air and the substrate, respectively,
and wherein the substrate comprises at least one of a high refractive index glass substrate and a high density polyethylene (HDPE) substrate, which have different optical or electromagnetic properties including impedance, refractive index, electric permittivity, and magnetic permeability.

3. The anti-reflection coating according to claim 2, wherein the structural double layer implements impedance matching between the two different materials.

4. The anti-reflection coating according to claim 2, wherein, when the substrate comprises the at least one of the high refractive index glass substrate and the high density polyethylene (HDPE) substrate.

5. The anti-reflection coating according to claim 2, wherein, when the substrate comprises the high refractive index glass substrate, the first layer and the second layer comprise tantalum oxide (Ta$_2$O$_5$), respectively, and the first distance and the second distance are created by interposing a porous material between the substrate and the first layer, and between the second layer and the first layer, respectively.

6. The anti-reflection coating according to claim 5, wherein, when the substrate comprises the high refractive index glass substrate, a thickness ratio of the first layer to the second layer is 1:5, and the second distance is 3.5 times greater than the first distance.

7. The anti-reflection coating according to claim 2, wherein, when the substrate comprises the high density polyethylene (HDPE) substrate, the first layer and the second layer comprises the same material as the substrate, and the first distance and the second distance are created by interposing Styrofoam between the substrate and the first layer, and between the second layer and the first layer, respectively.

8. The anti-reflection coating according to claim 7, wherein, when the substrate comprises the high density polyethylene (HDPE) substrate, the second distance is two times greater than the first distance.

9. A method of forming an anti-reflection coating, comprising:
forming a first layer positioned on a substrate to be spaced apart from the substrate by a first distance; and
forming a second layer positioned on the first layer to be spaced apart from the first layer by a second distance,
wherein a combination of the first layer and the second layer with a subwavelength distance forms a structural double layer comprising a single metamaterial which has spatiotemporal dispersion,
wherein the spatiotemporal dispersion refers to electromagnetic properties, which vary depending on both of a frequency and an incidence angle using spatial non-locality of an electromagnetic wave reaction of an incident light,
wherein the structural double layer shows an anomalous dispersion where a refractive index deduced from the electromagnetic properties decreases as the frequency increases,
wherein the structural double layer does not absorb the incident light,
wherein the electromagnetic wave reaction is an electromagnetic response of the structural double layer to electromagnetic waves of the incident light,
wherein each of the first layer and second layer comprises a plurality of unit cells, and
wherein a lower part of the plurality of unit cells is flat, and an upper part of the plurality of the unit cells forms a predetermined inclination angle.

10. The method according to claim 9, wherein the structural double layer blocks reflection of incident light between two different materials regardless of the frequency, the incidence angle, and a polarization direction of the incident light, and implements impedance matching between the two different materials,
wherein the two different materials are an air and the substrate, respectively,
and wherein the substrate comprises at least one of a high refractive index glass substrate and a high density polyethylene (HDPE) substrate, which have different optical or electromagnetic properties including impedance, refractive index, electric permittivity, and magnetic permeability,
wherein, when the substrate comprises the at least one of the high refractive index glass substrate and the high density polyethylene (HDPE) substrate.

* * * * *